United States Patent [19]

Elliott

[11] Patent Number: 4,549,985

[45] Date of Patent: Oct. 29, 1985

[54] WASTE DISPOSAL PROCESS

[75] Inventor: Henry H. Elliott, Pleasanton, Calif.

[73] Assignee: General Electric Company, San Jose, Calif.

[21] Appl. No.: 385,785

[22] Filed: Jun. 7, 1982

[51] Int. Cl.[4] .......................... G21F 9/04; B01D 11/00

[52] U.S. Cl. ...................................... 252/631; 210/682; 210/724; 423/11; 423/12; 423/15; 423/17

[58] Field of Search ................. 252/631; 423/6, 7, 10, 423/11, 15, 306, 311, 312, 18; 210/682, 723, 724

[56] References Cited

U.S. PATENT DOCUMENTS

| | | | |
|---|---|---|---|
| 2,733,200 | 1/1956 | Kunin | 423/7 |
| 2,789,879 | 4/1957 | Kaufman | 423/11 |
| 4,233,272 | 11/1980 | Ereson et al. | 423/7 |
| 4,265,861 | 5/1981 | Cleary et al. | 252/631 |
| 4,269,706 | 5/1981 | Sondermann | 423/11 |
| 4,301,122 | 11/1981 | Johnson | 423/15 |
| 4,349,513 | 9/1982 | Ishiwata et al. | 423/12 |
| 4,377,508 | 3/1983 | Rothberg | 252/631 |

FOREIGN PATENT DOCUMENTS

| | | | |
|---|---|---|---|
| 3006022 | 9/1980 | Fed. Rep. of Germany | 423/7 |
| 2460277 | 2/1981 | France | 423/15 |
| 0137400 | 11/1978 | Japan | 252/631 |
| 0023900 | 2/1979 | Japan | 423/10 |

*Primary Examiner*—Stephen J. Lechert, Jr.
*Assistant Examiner*—Howard J. Locker
*Attorney, Agent, or Firm*—Ivor J. James, Jr.; Samuel E. Turner; Raymond G. Simkins

[57] ABSTRACT

Method for precipitating and removing soluble metal compounds from solutions of phosphoric acid. The method is useful in the disposal of metal-containing phosphoric acid waste from electrolytic operations, including such acid solutions contaminated with uranium compounds.

33 Claims, 1 Drawing Figure

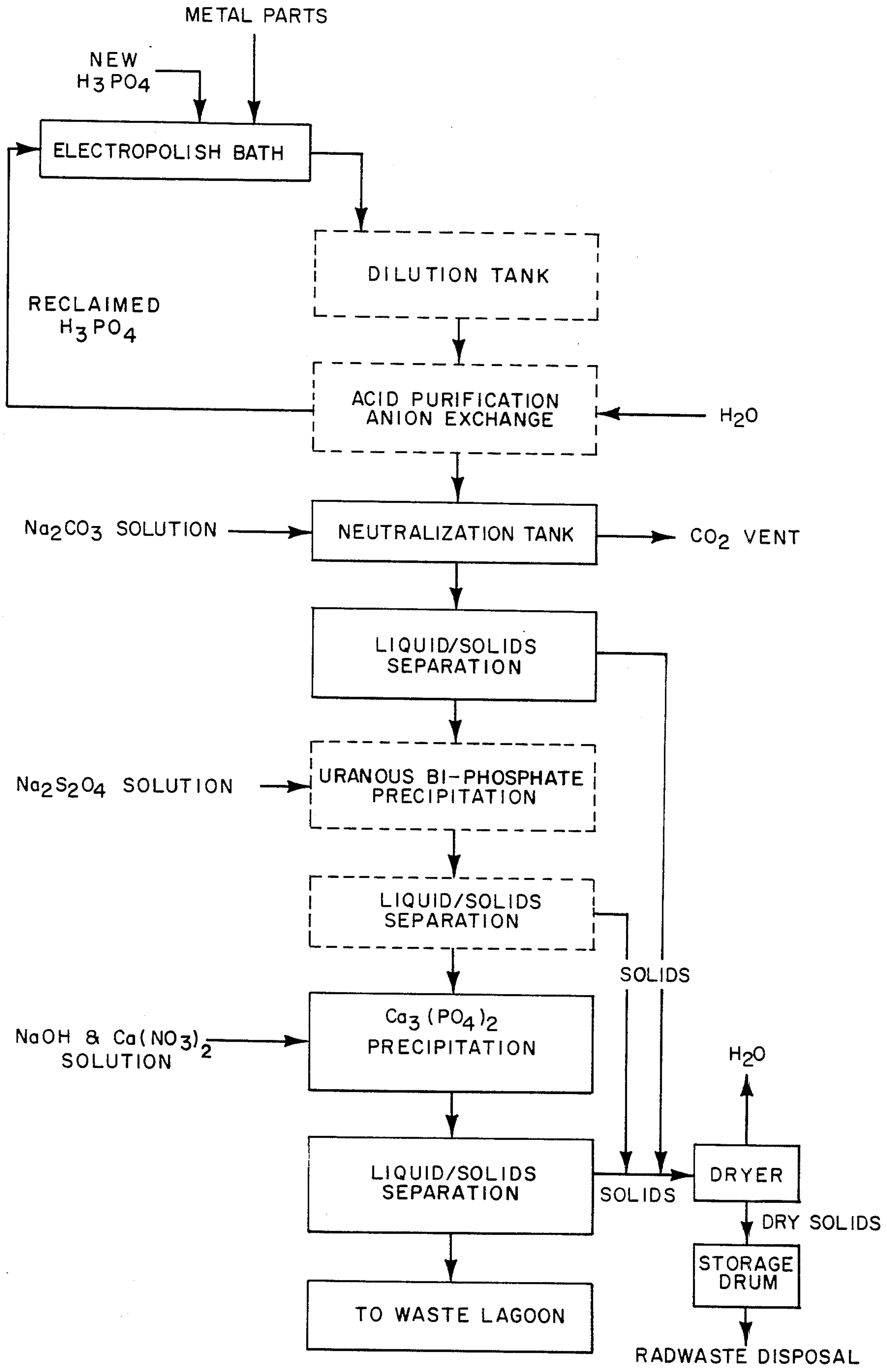
METAL PARTS
NEW $H_3PO_4$
ELECTROPOLISH BATH
DILUTION TANK
RECLAIMED $H_3PO_4$
ACID PURIFICATION ANION EXCHANGE
$H_2O$
$Na_2CO_3$ SOLUTION
NEUTRALIZATION TANK
$CO_2$ VENT
LIQUID/SOLIDS SEPARATION
$Na_2S_2O_4$ SOLUTION
URANOUS BI-PHOSPHATE PRECIPITATION
LIQUID/SOLIDS SEPARATION
SOLIDS
NaOH & $Ca(NO_3)_2$ SOLUTION
$Ca_3(PO_4)_2$ PRECIPITATION
$H_2O$
LIQUID/SOLIDS SEPARATION
SOLIDS
DRYER
DRY SOLIDS
STORAGE DRUM
TO WASTE LAGOON
RADWASTE DISPOSAL

WASTE DISPOSAL PROCESS

FIELD OF THE INVENTION

This invention relates to a procedure for recovering metals in the form of soluble compounds from solutions containing phosphoric acid. It comprises the solidification, separation and concentration of the metal compounds, including uranium, from phosphate solutions for disposal as waste, salvage or other apt disposition. The invention is specifically concerned with treating spent electrolytic solutions of phosphoric acid to recover excess acid and to separate and consolidate any metal contents thereof for disposal.

BACKGROUND OF THE INVENTION

Electrolytic processes comprising acid electrolyte baths are employed for a variety of purposes, including the cleaning or decontamination of metals, and metal articles or devices. Cleaning and decontamination by electrolytic means consists of removing a portion of the surface metal having soil or contaminates entrained therein. Surface removal by electrolysis, whether for aesthetic or practical reasons such as cleaning, is sometimes referred to as "electropolishing".

Electrolytic cleaning systems have been found to be effective for decontaminating metals exposed to radionuclides comprising plutonium, uranium, radium, cobalt, strontium, and americium. This system is highly effective for such contaminates when baked on, ground in, or otherwise difficult to remove with conventional decontamination procedures. Electropolishing teechniques typically only require a brief period of a few minutes to completely remove most types of surface contaminates.

In a typical system for electrolytic cleaning of contaminated surfaces of metals, the metal piece to be decontaminated serves as the anode in an acid containing electrolytic cell. The passage of electric current through the cell results in the anodic dissolution of the surface portion of the metal piece and, under proper operating conditions, a progressive smoothing of the surface. Any contaminates adhering to the metal surface or entrapped within surface pores or imperfections are removed along with the surface portion of the metal piece and released into the electrolyte by the metal dissolution process. The amount of metal removed from the surface of the piece to achieve decontamination is usually less than about 0.002 inch, and it is removed uniformly with no preferential attack of grain boundaries or other microstructural aspects. Moreover, the remaining surface after electropolishing has been found to usually have better corrosion resistance and other properties than did the original surface.

The use of electropolishing measures for the removal of radioactive contaminates from metal objects can provide significant savings and other benefits. For instance contaminated machine parts and apparatus can be decontaminated to background radiation levels and then released unconditionally for repair or other service. Metals in general, and articles thereof, can be decontaminated and sold for reuse, salvage or scrap.

Electropolish decontamination, however, produces spent electrolyte comprising an acid such as phosphoric which is contaminated with one or more soluble metal compounds. Typical soluble wastes derived from electrolytically treating high iron or high nickel containing alloys can include a variety of metals such as iron, nickel, molybdenum, copper, zinc, chromium, aluminum, cobalt and manganese. Additionally, when treating radioactive contaminated metals, the spent electrolyte can also include soluble compounds of uranium, plutonium, radium, cobalt, strontium, and americium. The disposal of any radioactive waste material of course requires special considerations which can be more easily complied with if the material is reduced in volume to a maximum degree for safe packaging, transportation and storage.

SUMMARY OF THE INVENTION

This invention comprises a method for solidifying and separating dissolved metal compounds including uranium from solutions of phosphoric acid. The method includes a sequence of chemical precipitations and solids removal for the separation and concentration of metal constituents for disposal, and also the recovery and recycling of phosphoric acid electrolyte.

OBJECTS OF THE INVENTION

It is a primary object of this invention to provide a method for removing dissolved metals from spent phosphoric acid electrolyte.

It is also an object of this invention to provide a method for precipitating, separating and consolidating soluble metal constituents including uranium from solutions of phosphoric acid.

It is a further object of this invention to provide a method for removing soluble uranium compounds from phosphoric acid electrolyte, and thereby enabling the concentration of radioactive uranium for recovery or waste disposal.

It is another object of this invention to provide a method for disposing of waste phosphoric acid solution contaminated with dissolved metal compounds, including uranium compounds.

DESCRIPTION OF THE DRAWING

The drawing comprises a flow sheet diagram illustrating the principal steps and their sequence of the method of this invention.

DETAILED DESCRIPTION OF THE INVENTION

This invention comprises a method for processing an acid solution containing dissolved metal compounds such as spent acid electrolyte from an electrolytic bath. The method is specifically directed to the solidification, separation and consolidation of soluble compounds of metals including uranium and radioactive components from phosphoric acid solutions for disposal or recovery of the respective constituents.

The invention is capable of dealing with phosphoric acid solutions including soluble forms of metals such as iron, nickel, molybdenum, copper, zinc, chromium, aluminum, cobalt and manganese, and radio-nuclides including plutonium, uranium, radium, cobalt, strontium, and americium. Uranium may be present in the phosphoric acid solution in both soluble and insoluble compounds comprising $UO_2$, $U_3O_8$, $UO_4$, $(NH_4)_2U_2O_7$, $CaU_2O_7$, $UF_4$ and $UO_2F_2$.

Referring to the diagram of the drawing, an electroplating system is illustrated comprising an electrolytic bath containing phosphoric acid as the electrolyte for the electropolishing of metal in accordance with the techniques of the art. This invention deals with the spent electrolyte from such a system, comprising phosphoric acid solution containing metals dissolved therein and retained as soluble compounds in the acid medium.

The metal-containing acid solution effluent from the electrolytic bath system can be subjected to a preliminary treatment of its contact with an anion exchange medium when it is appropriate to increase the concentration ratio of the dissolved metals to the acid of the solution, and to reclaim phosphoric acid for return and reuse within the electrolytic bath of the system.

The effluent from the electrolytic bath can be diluted if its viscosity is so high (for example a specific gravity of greater than about 1.5) as to retard effective percolation through a particulate mass of the ion exchange medium and a preliminary filtering for the purpose of excluding any solids from obstructing flow through the ion exchange material and polluting the exchange material.

Contact with an anion exchange material removes a substantial portion of the phosphoric acid by preferential diffusion into the exchange material from the electrolyte solution effluent, which results in an increased proportion of dissolved metals to free phosphoric acid in solution free of the remaining exchange material. The phosphoric acid absorbed by the anion exchange material can be recovered and recycled to the electrolytic bath for reuse by washing the resin free of acid with water.

The acid solution or the effluent from the ion exchange material, or unit containing same, consisting of a high dissolved metal-to-acid solution is treated for the initial metal precipitation by the addition of a solution of a carbonate of an alkali metal. The carbonate solution is introduced in an amount sufficient to lower the pH of the acid solution to about 5 to 6. Heat and agitation can be applied to the solution following the carbonate addition to expel carbon dioxide therefrom.

Sodium carbonate ($Na_2CO_3$) is preferred for this precipitation, but other useful carbonates comprise sodium bicarbonate, potassium carbonate, and potassium bicarbonate.

The reaction of the preferred sodium carbonate with the phosphoric acid solution is shown in the equation:

$$4H_3PO_4+3Na_2CO_3 \rightarrow 2Na_2HPO_4+2NaH_2PO_4+3H_2O+3CO_2 \quad [1]$$

Typical metals in the solution form mixed hydroxides and phosphates of generally low solubilities whereby the bulk of the initial soluble metals are precipitated out of solution at this stage of the process. However, when such a solution contains soluble uranium compounds, a portion thereof remain soluble as a tri-carbonate complex.

The solids precipitated from the acid solution by the addition of the carbonate are separated and removed from the liquid portion by conventional means, such as filtration, settling or centrifuging. The remaining filtrate or supernate solution is passed to the next operation while the solids recovered are retained for a suitable disposal.

When the soluble uranium compound content of the solution is significant, (for example about 5 or more parts per million by weight), it is preferred to subject the solution to an intermediate precipitation treatment of the addition thereto of sodium hydrosulfite ($Na_2S_2O_4$) solution.

The reaction of the sodium hydrosulfite in the phosphoric acid solution produces uranous bi-phosphate having the following formula:

$$U(HPO_4)_2$$

To maximize the uranous precipitation produced by the addition of sodium hydrosulfite, the phosphoric acid solution should be neutralized with a carbonate solution such as sodium carbonate with an adjusted concentration which leaves the resultant neutralized supernate at the optimum phosphate concentration at about $1.1\pm0.2$ moles per liter. If the resultant phosphate concentration is too high, it can be reduced by water dilution, or if it is too low, it can be increased by evaporation.

Also, to maximize the precipitation, it is preferred that the sodium hydrosulfite be introduced into the solution while at a temperature of about 75° C. and with agitation.

The solids precipitated from the solution by the addition of the sodium hydrosulfite are separated and recovered from the liquid portion by conventional means, including filtration, settling or centrifuging. The remaining filtrate or supernate solution is passed to the next operation while the solids recovered are retained for a suitable disposal.

The final precipitation of the sequence comprises the addition of a soluble calcium salt, comprising calcium nitrate or calcium chloride, and also an alkali metal hydroxide to the filtrate or supernate solution from the former precipitation and solids separation. The preferred calcium salt is calcium nitrate, which is added first. The pH of the solution is subsequently adjusted to a basic condition with the metal hydroxide, preferably sodium hydroxide. The reaction mechanism for this precipitation is shown in the equations:

$$2Na_2HPO_4+3Ca(NO_3)_2 \rightarrow Ca_3(PO_4)_2+4NaNO_3+2HNO_3 \quad [2]$$

$$2HNO_3+2NaOH \rightarrow 2NaNO_3+2H_2O \quad [3]$$

As indicated, following the addition of calcium nitrate, a pH reversal occurs due to the formation of nitric acid. The fromed nitric acid reverses the reaction of equation 2 allowing for some phosphate solubility. The hydroxide is added to reverse this occurrence of solubility, and also to minimize the solubility of any contained residual metal ions.

At a pH of about 10, the individual metal hydroxide ions' solubilities are at or near their minimums. All metals are present below 2 parts per million in the resultant solution filtrate or supernate and copper, molybdenum, cobalt, chromium and uranium are below 1 part per million.

The calcium nitrate can be added at about 10 up to about 50 percent excess phosphate stoichiometry with good results. The precipitation reaction is preferably carried out in a hot solution of about 50° C.

The solids precipitated from the solution by the addition of the calcium salt and the alkali metal hydroxide are separated and recovered from the liquid portion by conventional means, including filtration, settling or centrifuging.

The precipitated solids from each of the foregoing solidification and separation operations can be dehydrated to reduce their volume and combined if appropriate, for disposal or salvage.

The filtrate or supernate solution from the foregoing sequence of solidification and separation operations, consisting primarily of a solution of sodium nitrate, and essentially free of radio-nuclides, can be safely disposed of in a waste retention lagoon or in other apt waste repositories.

The procedures of the invention provides for the separation of potentially radioactive materials from a liquid medium and their solidification and reduction to a minimum volume for isolation and storage in a safe and efficient manner.

What is claimed is:

1. A method for solidifying and separating constituents from phosphoric acid solutions containing uranium and dissolved metals, comprising the steps of:

(a) adding an alkali metal carbonate to a solution of phosphoric acid containing uranium and dissolved metals in at least about stoichiometric proportions to the acid content of the solution, and separating precipitated insolubles therefrom;

(b) adding a calcium salt to the solution in amount of about 10 to about 50 percent in excess of stoichiometric proportions with the phosphate content; and (c) adding an alkali metal hydroxide to the solution and adjusting the pH of said solution to at least about 10, and separating precipitated insolubles therefrom.

2. The solidifying and separating method of claim 1, wherein the alkali metal carbonate added to the solution comprises at least one metal carbonate selected from the group consisting of sodium carbonate, sodium bicarbonate, potassium carbonate, and potassium bicarbonate.

3. The solidifying and separating method of claim 1, wherein the calcium salt added to the solution comprises at least one calcium salt selected from the group consisting of calcium nitrate and calcium chloride.

4. The solidifying and separating method of claim 1, wherein the alkali metal hydroxide added to the solution to adjust the pH thereof comprises sodium hydroxide.

5. A method for solidifying and separating constituents from phosphoric acid solutions containing dissolved metals including uranium compounds, comprising the steps of:

(a) adding an alkali metal carbonate to a solution of phosphoric acid containing uranium and dissolved metals in at least about stoichiometric proportions to the acid content of the solution, and separating precipitated insolubles therefrom;

(b) adding sodium hydrosulfite to the solution, and separating precipitated insolubles therefrom;

(c) adding a calcium salt to the solution; and (d) adding an alkali metal hydroxide to the solution and adjusting the pH of said solution to at least about 10, and separating precipitated insolubles therefrom.

6. A method for solidifying and separating constituents from phosphoric acid solutions containing dissolved metals including uranium compounds, comprising the steps of:

(a) adding at least one metal carbonate selected from the group consisting of sodium carbonate, sodium bicarbonate, potassium carbonate, and potassium bicarbonate to a solution of phosphoric acid containing uranium and dissolved metals in at least about stoichiometric proportions to the acid content of the solution, and adjusting the phosphate concentration thereof to about $1.1 \pm 0.2$ molar, and separating precipitated insolubles therefrom;

(b) adding sodium hydrosulfite to the solution, and separating precipitated insolubles therefrom;

(c) adding at least one calcium salt selected from the group consisting of calcium nitrate and calcium chloride to the solution in amount of about 10 to about 50 percent in excess of stoichiometric proportions with the phosphate content; and (d) adding sodium hydroxide to the solution and adjusting the pH of said solution to at least about 10, and separating precipitate insolubles therefrom.

7. The solidifying and separating method of claim 6, wherein the carbonate added to the solution comprises sodium carbonate.

8. The solidifying and separating method of claim 6, wherein the calcium salt added to the solution comprises calcium nitrate.

9. The solidifying and separating method of claim 6, wherein the separated precipitated insolubles from each step are combined and dehydrated for disposal.

10. A method for solidifying and separating constituents from phosphoric acid solutions containing uranium and dissolved metals, comprising the steps of:

(a) contacting a solution of phosphoric acid containing uranium and dissolved metals with an anion exchange material and removing phosphate ions therefrom to thereby increase the concentration ratio of the dissolved metals to the acid;

(b) adding an alkali metal carbonate to the solution in at least about stoichiometric proportions to the acid content of the solution, and separating insolubles therefrom;

(c) adding a calcium salt to the solution in amount of about 10 to about 50 percent in excess of stoichiometric proportions with the phosphate content; and (d) adding an alkali metal hydroxide to the solution and adjusting the pH of said solution to at least about 10, and separating insolubles therefrom.

11. The solidifying and separating method of claim 10, wherein the carbonate added to the solution comprises at least one metal carbonate selected from the group consisting of sodium carbonate, sodium bicarbonate, potassium carbonate, and potassium bicarbonate.

12. The solidifying and separating method of claim 10, wherein the calcium salt added to the solution comprises at least one calcium salt selected from the group consisting of calcium nitrate and calcium chloride.

13. The solidifying and separating method of claim 10, wherein the alkali metal hydroxide added to the solution to adjust the pH thereof comprises sodium hydroxide.

14. A method of solidifying and separating constituents from phosphate acid solutions containing uranium and dissolved metals, comprising the steps of:

(a) contacting a solution of phosphoric acid containing uranium and dissolved metals with an anion exchange medium and removing phosphate ions therefrom to thereby increase the concentration ratio of the dissolved metals to the acid;

(b) adding at least one metal carbonate selected from the group consisting of sodium carbonate, sodium bicarbonate, potassium carbonate, and potassium bicarbonate to the solution in at least about stoichiometric proportions to the acid content of the solution, and separating insolubles therefrom;

(c) adding at least one calcium salt selected from the group consisting of calcium nitrate and calcium chloride to the solution in amount of about 10 to about 50 percent in excess of stoichiometric proportions with the phosphate content; and (d) adding sodium hydroxide to the solution and adjusting the pH of said solution to at least about 10, and separating insolubles therefrom.

15. The solidifying and separating method of claim 14, wherein the metal carbonate added to the solution comprises sodium carbonate.

16. The solidifying and separating method of claim 14, wherein the calcium salt added to the solution comprises calcium nitrate.

17. The solidifying and separating method of claim 14, wherein the separated insolubles from each step are combined and dehydrated.

18. A method for solidifying and separating constituents from phosphoric acid solution containing uranium and dissolved metals, comprising the steps of:

(a) contacting a solution of phosphoric acid containing uranium and dissolved metals with an anion exchange material and removing phosphate ions therefrom to thereby increase the concentration ratio of the dissolved metal to the acid;

(b) adding sodium carbonate to the solution in at least about stoichiometric proportions to the acid content of the solution, and separating the insolubles precipitated therefrom;

(c) adding calcium nitrate to the solution in amount of about 10 to about 50 percent in excess of stoichiometric proportions with the phosphate content; and (d) adding sodium hydroxide to the solution and adjusting the pH of said solution to at least about 10, and separating the insolubles precipitated therefrom.

19. A method for solidifying and separating constituents from phosphoric acid solutions containing dissolved metals including uranium compounds, comprising the steps of:

(a) contacting a solution of phosphoric acid containing dissolved metals with an anion exchange material and removing phosphate ions therfrom to thereby increase the concentration ratio of the dissolved metals to the acid;

(b) adding an alkali metal carbonate to the solution in at least about stoichiometric proportions to the acid content of the solution, and separating precipitated insolubles therefrom;

(c) adding sodium hydrosulfite to the solution, and separating precipitated insolubles therefrom;

(d) adding a calcium salt to the solution in amount of about 10 to about 50 percent in excess of the stoichiometric proportions with the phosphate content; and (e) adding an alkali metal hydroxide to the solution and adjusting the pH of said solution to at least about 10, and separating precipitated insolubles therefrom.

20. The solidifying and separating method of claim 19, wherein the alkali metal carbonate added to the solution comprises at least one metal carbonate selected from the group consisting of sodium carbonate, sodium bicarbonate, potassium carbonate, and potassium bicarbonate.

21. The solidifying and separating method of claim 19, wherein the calcium salt added to the solution comprises at least one calcium salt selected from the group consisting of calcium nitrate and calcium chloride.

22. The solidifying and separating method of claim 19, wherein the alkali metal hydroxide added to the solution to adjust the pH thereof comprises sodium hydroxide.

23. The solidifying and separating method of claim 19, wherein the separated precipitated insolubles from each step are combined and dehydrated for disposal.

24. A method for solidifying and separating constituents from phosphoric acid solutions containing dissolved metals including uranium compounds, comprising the steps of:

(a) contacting a solution of phosphoric acid containing dissolved metals including uranium compounds with an anion exchange material and removing phosphate ions therefrom to thereby increase the concentration ratio of the dissolved metals to the acid;

(b) adding at least one metal carbonate selected from the group consisting of sodium carbonate, sodium bicarbonate, potassium carbonate, and potassium bicarbonate to the solution in at least about stoichiometric proportions to the acid content of the solution, and separating precipitated insolubles therefrom;

(c) adding sodium hydrosulfite to the solution, and separating precipitated insolubles therefrom;

(d) adding at least one calcium salt selected from the group consisting of calcium nitrate and calcium chloride to the solution in amount of from about 10 to about 50 percent in excess of stoichiometric proportions with the phosphate content; and (e) adding sodium hydroxide to the solution and adjusting the pH of said solution to at least about 10, and separating precipitated insolubles therefrom.

25. The solidifying and separating method of claim 24, wherein the carbonate added to the solution comprises sodium carbonate.

26. The solidifying and separating method of claim 24, wherein the calcium salt added to the solution comprises calcium nitrate.

27. The solidifying and separating method of claim 24, wherein the separated precipitated insolubles from each step are combined and dehydrated for disposal.

28. A method for solidifying and separating constituents from phosphoric acid solutions containing dissolved metals including uranium compounds, comprising the steps of:

(a) contacting a solution of phosphoric acid containing dissolved metals with an anion exchange material and removing phosphate ions therefrom to thereby increase the concentration ratio of the dissolved metals to the acid;

(b) adding an alkali metal carbonate to the solution in at least about stoichiometric proportions to the acid content of the solution and adjusting the phosphate concentration thereof to about $1.1\pm0.2$ molar, and separating precipitated insolubles therefrom;

(c) adding sodium hydrosulfite to the solution, and separating precipitated insolubles therefrom;

(d) adding a calcium salt to the solution in amount of about 10 to about 50 percent in excess of stoichiometric proportions with the phosphate content; and (e) adding an alkali metal hydroxide to the solution and adjusting the pH of said solution to at least about 10, and separating precipitated insolubles therefrom.

29. A method for solidifying and separating constituents from phosphoric acid solutions containing dissolved metals including uranium compounds, comprising the steps of:

(a) contacting a solution of phosphoric acid containing dissolved metals including uranium compounds with an anion exchange material and removing phosphate ions therefrom to thereby increase the concentration ratio of the dissolved metals to the acid;

(b) adding at least one metal carbonate selected from the group consisting of sodium carbonate, sodium bicarbonate, potassium carbonate, and potassium bicarbonate to the solution in at least about stoichiometric proportions to the acid content of the solution and adjusting the phosphate concentration thereof to about 1.1±0.2 molar, and separating precipitated insolubles therefrom;

(c) adding sodium hydrosulfite to the solution, and separating precipitated insolubles therefrom;

(d) adding at least one calcium salt selected from the group consisting of calcium nitrate and calcium chloride to the solution in amount of about 10 to about 50 percent in excess of stoichiometric proportions with the phosphate content; and (e) adding sodium hydroxide to the solution and adjusting the pH of said solution to at least about 10, and separating precipitated insolubles therefrom.

30. The solidifying and separating method of claim 29, wherein the carbonate added to the solution comprises sodium carbonate.

31. The solidifying and separating method of claim 29, wherein the calcium salt added to the solution comprises calcium nitrate.

32. The solidifying and separating method of claim 29, wherein the separated precipitated insolubles from each step are combined and dehydrated for disposal.

33. A method for solidifying and separating constituents from phosphoric acid solutions containing uranium and dissolved metals, comprising the steps of:

(a) adding an alkali metal carbonate to a solution of phosphoric acid containing uranium and at least one dissolved metal selected from the group consiting of iron, nickel, molybdenum, copper, zinc, chromium, aluminum, cobalt and magnesium in at least about stoichiometric proportions to the acid content of the solution, and separating precipitated metal insolubles therefrom;

(b) adding a calcium salt to the solution in amount of about 10 to about 50 percent in excess of stoichiometric proportions with the phosphate content; and (c) adding an alkali metal hydroxide to the solution and adjusting the pH of said solution to at least about 10, and separating precipitated metal insolubles therefrom.

* * * * *